United States Patent Office 3,589,864
Patented June 29, 1971

3,589,864
PROCESS FOR RECOVERING HYDROGEN CHLORIDE FROM A SPENT ORGANO-CHLORINE COMPOUND
Shigeho Ezaki, Kanagawa-ken, Japan, assignor to Yawata Chemical Engineering Co., Ltd., Tokyo, Japan
Filed Apr. 1, 1969, Ser. No. 811,905
Claims priority, application Japan, Apr. 3, 1968, 43/21,404
Int. Cl. C01b 7/08
U.S. Cl. 23—154                                           1 Claim

ABSTRACT OF THE DISCLOSURE

An economical process for recovering hydrogen chloride from a spent organo-chlorine compound comprising carrying out a combustion treatment of spent liquor or waste gas containing organo-chlorine compound, the discharge of which in the untreated form is undesirable from the viewpoint of minimizing public nuisance, converting almost all the chlorine contained in the organic spent liquor or waste gas to hydrogen chloride, recovering the thus converted hydrogen chloride as hydrogen chloride gas or hydrochloric acid having a concentration of higher than the azeotropic composition of $HCl-H_2O$ system i.e. approximately 20% by weight, and at the same time, discharging other components into the atmosphere in the form of completely harmless and odorless gases.

BACKGROUND OF THE INVENTION

(1) Field of the invention

Figure 1:
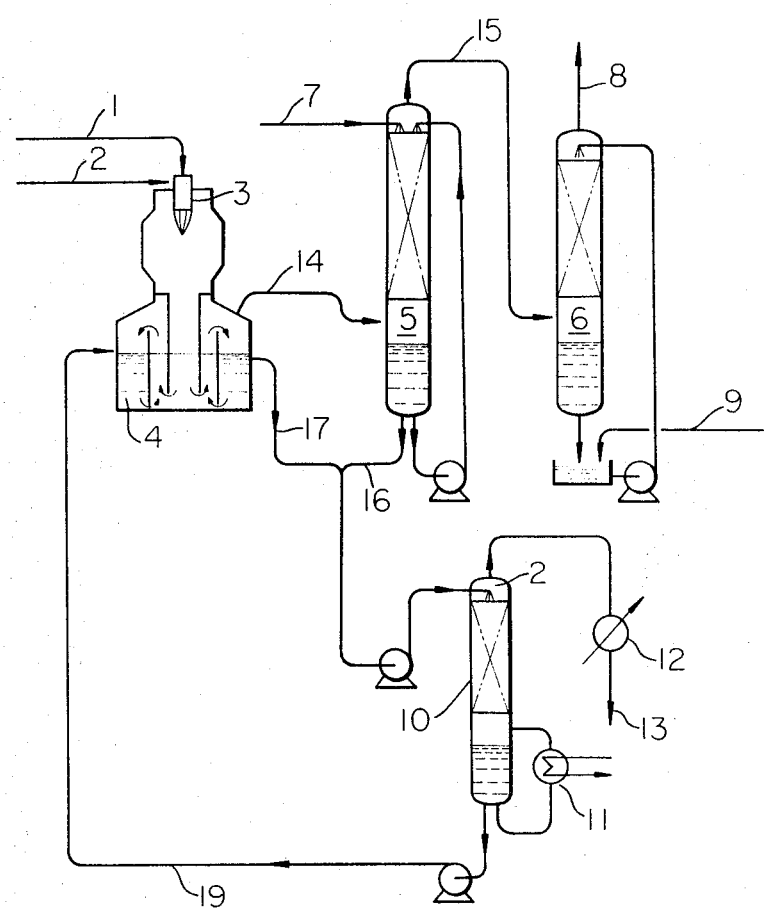

The present invention relates to a process for recovering hydrogen chloride from an organo-chlorine compound which comprises burning a spent liquor or a spent gas containing an organo-chlorine compound at an appropriate air ratio, converting the contained chlorine to hydrogen chloride, thereafter recovering the hydrogen chloride in the form of hydrogen chloride gas or hydrochloric acid having an appropriate concentration, and discharging the remaining components as completely harmless and odorless gases.

With the rapid development of large scale chemical industry, the discharge of by-products or of spent materials has become a serious problem. One object of the present invention is to eliminate the public nuisance caused by discharge of industrial waste; a second object is to recover the industrially useful hydrogen chloride from a stream which has heretofore been discharged merely as a spent material. Needless to say, said objects must be achieved in an economical and simple way. The present invention provides a method for recovering hydrogen chloride from a spent organo-chlorine compound at low cost by use of a simple apparatus and at a low utility requirement.

SUMMARY OF THE INVENTION

Accordingly, the present invention relates to a process for recovering hydrogen chloride from an organo-chlorine compound. Said process is characterized by a combination of (1) the combustion of the organo-chlorine compound to convert the chlorine contained therein to hydrogen chloride; (2) a concentrating step consisting of the cooling of a gas and concentrating an extracting agent solution simultaneously by conducting direct heat exchange of the hot hydrogen chloride containing combustion gas produced in said combustion step (1) with an extracting agent solution obtained as a distillation residue in the undermentioned distillation step (4); (3) absorption of the hydrogen chloride contained in the cooled gas in water to obtain a dilute hydrogen chloride solution; and (4) extractive distillation of said dilute hydrogen chloride solution by use of the extracting agent solution obtained from said concentrating step (2) to obtain hydrogen chloride having a concentration of higher than approximately 20% by weight as a distillate.

DETAILED DESCRIPTION OF THE INVENTION

A stream having a spent organo-chlorine compound is burned so as to leave almost no soot or an unburned material, and to such an extent as to allow the chlorine contained in said stream to be converted completely to hydrogen chloride vapor. In order to assure the best possible results from this combustion, the ratio of combustion air plays an important role. In general, the use of 100–120% of the theoretical air requirement is preferable. The combustion temperature of higher than 1000° C. is considered appropriate. If a great amount of water is present in the stream or if the spent gas is of low-calory content, the combustion of an auxiliary fuel is occasionally required.

Any spent product stream containing organo-chlorine compound can be treated in a method of the present invention, for example, chloromethane, chloroethane, chloropropane, chloroethylene, chlorobutylene, chlorobenzene, chloroacetone, chloroaceto aldehyde, monochloropropione aldehyde, slurry containing vinyl chloride resin powder and the like.

Now, in order to clarify the present invention a detailed explanation will be given with reference to the attached drawings, which are simplified flow charts illustrating specific preferred embodiments for carrying out the method of the invention. It should be noted therefore that the drawings are given merely for explanatory purposes and are not to be taken as unduly limiting the scope of the present invention.

In FIG. 1, the spent organic compound to be subjected to combustion treatment and the combustion air are both led to burner 3, where the spent organic compound is burned, via lines 1 and 2 respectively. The hot combustion gas containing hydrogen chloride is injected into an extracting agent liquid bath (extracting agent solution concentrator) 4, where the gas is cooled by the direct heat exchange between the gas and the liquid, and simultaneously, the water in the extracting agent liquid bath is caused to evaporate by said combustion gas and, thus the concentration of the extracting agent solution is carried out. The method by which a liquid is heated and caused to evaporate by contacting with a hot combustion gas injected directly into the liquid stored in a tank is generally called "submerged combustion method." The apparatus in FIG. 1, wherein burner 3 is combined with extracting agent liquid bath 4, is a kind of "submerged combustion apparatus" and said apparatus is suitable for carrying out the method claimed in the present invention. The concentrated extracting agent solution is transported to the undermentioned extractive distillation step.

The gas cooled by heat exchange is introduced to the lower part of absorber 5 via line 14, and is contacted countercurrently with water provided via line 7 that joins the upper part of the column. The structure of the absorber does not play an essential role in the method of the present invention, and therefore, any suitable contacting apparatus can be used. Some of the column types usable therefor include plate tower such as bubble cap plate and perforated plate, and packed tower packed with Raschig ring, Lessing ring, cross-partition ring, Pall ring, Berl saddle, Intalox saddle, Tellerette, spiral ring, etc. Corrosive materials are involved in the operation, so a packed tower is preferable, since it is easier to maintain. The hydrogen chloride vapor in the gas is absorbed by contacting, directly and countercurrently with a water spray, said water preferably being sprayed from the upper part of the column. As a result, a 16–18% hydrogen chloride solution, and in some cases, a solution approximating the azeotropic composition can be obtained from the bottom of the column. In case the concentration obtained is low, it is possible to recirculate a part of the hydrogen chloride solution obtained from the bottom of absorber 5 to the top. In case a packed tower is used as an absorber, said recirculation is required in some cases in order to secure the liquid load necessary for providing appropriate gas-liquid contact.

Figure 2:
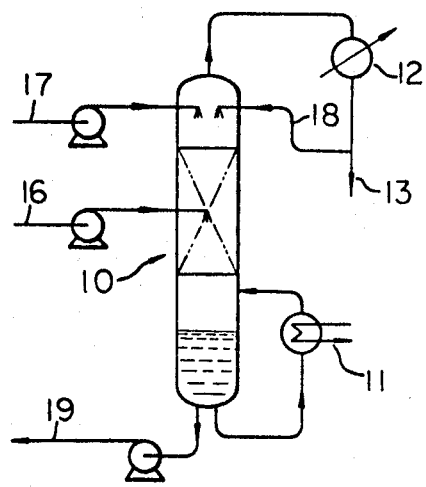
Figure 3:
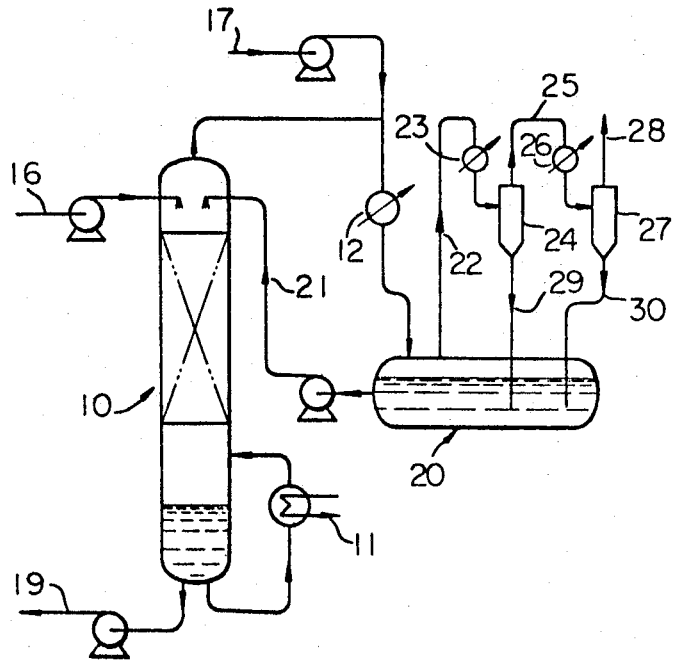

The gas released from the upper part of said absorber 5 consisting mainly of nitrogen, carbon dioxide and steam can be transported to the lower part of scrubber 6 via line 15 in order to eliminate any remaining harmful materials. In scrubber 6, the gas is countercurrently contacted with a dilute alkaline solution which is introduced via line 9, and circulated through the column. Said dilute alkaline solution contains, for example, sodium carbonate, sodium bicarbonate, sodium hydroxide and calcium hydroxide or the like. The small amount of unrecovered hydrogen chloride can be removed in column 6 through neutralization. Thus, the gas is made completely harmless and odorless and is released into the atmosphere from the top via line 8. Thereafter, in order to concentrate the dilute hydrogen chloride solution withdrawn from the bottom of absorber 5 via line 16 to a concentration of higher than the azeotropic composition, said dilute hydrogen chloride solution is subjected to a continuous mixing with the concentrated extracting agent solution passed from said liquid bath 4 via line 17, and is provided to the top of the extractive distillation column 10. Reboiler 11 provided at the bottom of the extractive distillation column supplies the heat necessary for effecting the distillation, and thus the extractive distillation is carried out. The vapor withdrawn from the top of the distillation column is condensed as it is in condenser 12, and is recovered in the form of hydrogen chloride solution having a concentration higher than the azeotropic composition and high purity via line 13. As can easily be understood to those in the art, when it is required, a part of the aforementioned hydrogen chloride solution can also be returned to the extractive distillation column via line 18 as a reflux stream. In such case, the piping system to the extractive distillation column is usually modified as shown in FIG. 2. As a result of the extractive distillation, the extracting agent solution diluted with water is recirculated to the extracting agent liquid bath 4 via line 19 from the lower part of the column, where said extracting agent solution is reused after effecting a direct heat exchange with the combustion gas and carrying out concentration as has been mentioned in the foregoing. In the extractive distillation step, in some cases, it is also possible to obtain an anhydrous hydrogen chloride gas by the combined use of a partial condenser. FIG. 3 illustrates an example of above. The vapor withdrawn from the top of the extractive distillation column 10 is mixed with the concentrated extracting agent solution provided via line 17. The mixture thereof is then passed through condenser 12, and thereafter, the gas-liquid two phase mixture thus obtained is provided to gas-liquid separator 20. A separated solution containing an extracting agent is provided to the top of the extractive distillation column 10 via line 21. On the other hand, the separated vapor passes through line 22, partial condenser 23, demister 24, line 25, partial condenser 26 and demister 27 in succession, and thereafter said vapor is recovered from line 28 in the form of an anhydrous hydrogen chloride. The hydrogen chloride solution separated in demisters 24 and 27 is returned to gas-liquid separator 20 via lines 29 and 30.

As the extracting agent solution, an aqueous solution of an inorganic compound having high hygroscopicity, i.e., sulfuric acid, calcium chloride, lithium chloride and ferric chloride or the like is preferable, and particularly preferable is the use of an aqueous solution of calcium chloride or sulfuric acid. The amount of the extracting agent solution to be circulated and the concentration thereof can easily be adjusted depending on the concentration of the hydrogen chloride to be recovered.

As has been mentioned in the foregoing, the present invention relates to a method characterized by carrying out a combustion treatment of an organic spent liquor or spent gas containing organo-chlorine compound, converting the chlorine contained therein to hydrogen chloride, and at the same time, utilizing the combustion heat effectively for effecting the concentration of the extracting agent solution, and further by recirculating the concentrated extracting agent solution as an extracting agent for use in the extractive distillation, concentrating the hydrogen chloride to higher than the azeotropic composition, for example, 35% and still up to 100%, thus increasing the commercial value of the recovered hydrogen chloride, and simultaneously eliminating a potential public nuisance. The recovered hydrogen chloride is of extremely high purity because it has gone through a distillation or evaporation step.

The following examples illustrate the further embodiments of the present invention.

Example 1.—The present example illustrates the case of carrying out the treatment, by the step shown in FIG. 1, of a spent liquor (calorific value of approximately 7,500 kcal./kg.) having as a main ingredient monochlorocyclohexane obtained from a hexane-recovering equipment in the photo-nitrosation method caprolactam production plant. Sulfuric acid was used in said treatment as an extracting agent.

(a) The spent liquid was burned by submerged combustion apparatus,[1] and simultaneously an appropriate amount of water was added to the extracting agent liquid bath so as to avoid excessive concentration of the agent and to lower the gas temperature.

Auxiliary fuel was required for effecting preheating of the furnace only at the time of "start-up" of the apparatus; the use of auxiliary fuel was not necessary after the combustion reached to a normal running. At this point the temperature at the inside of the furnace was approximately 1,600° C., while the concentration and temperature of the sulfuric acid solution discharged from the extracting agent liquid bath were approximately 71.5% and 160° C., respectively.

|  | Kg./hr. |
|---|---|
| Spent liquor | 500 |
| Air for effecting combustion | 4,960 |
| Water added into the bath 4 | 3,350 |
| Sulfuric acid solution discharged from the extracting agent liquid bath | 4,180 |

(b) The packed section of the packed tower used as an absorber was divided into three separated parts; upper, middle and lower parts respectively, and a part of descending water led from each part thereof was recirculated to the top of said each part in addition to the fresh absorbing water provided. The concentration and temperature of the hydrochloric acid solution discharged from the bottom were approximately 13% and 90° C. respectively.

|  | Kg./hr. |
|---|---|
| Absorbing water | 1,720 |
| Circulating water in each part | 16,500 |
| Hydrochloric acid solution discharged from the bottom | 2,160 |

(c) In a packed tower used as a scrubber, slaked lime slurry having a concentration of approximately 5% was circulated, and as the basisity of the slurry weakened, the slaked lime was supplemented, or a part of the circulating liquid was discharged and was replaced by a fresh slurry. Hydrogen chloride in the spent gas was negligible.

---

[1] Thermal Research & Engineering Corp., Conshohocken, Pa., thermal Sub-X submerged combustion heating and evaporating equipment (Sub-X is a registered trademark of Thermal).

Chlorine in the amount of approximately 20 p.p.m. was detected.

| | Kg./hr. |
|---|---|
| Circulating slaked lime slurry | 18,000 |

(d) A packed tower was used as an extractive distillation tower, wherein the distillate was totally condensed. Hydrochloric acid having a concentration of approximately 35% was recovered from the condenser. Meanwhile, the concentration and temperature of the sulfuric acid solution discharged from the bottom were approximately 50.9% and 120° C. respectively. In addition, hydrochloric acid in the amount of approximately 2.1% was contained in said solution.

| | Kg./hr. |
|---|---|
| Steam required for reboiler | 450 |
| Sulfuric acid solution discharged from the bottom | 5,900 |
| Recovered hydrochloric acid solution | 420 |

Example 2.—In a step wherein the process for effecting an extractive distillation shown in FIG. 1 has been changed to that shown in FIG. 3, the present example illustrates the case of carrying out the treatment of the spent liquor having a composition of $$C:H:Cl = 40.7:3.3:56.0$$

calorific value 3500 kcal./kg., obtained from the plant where vinyl chloride monomer was produced from ethylene by the oxychlorination method. Calcium chloride was used as an extracting agent.

(a) The use of combustion apparatus and auxiliary fuel was the same as in Example 1. The temperature at the inside of the furnace under normal running was approximately 1500° C., and the concentration and temperature of a calcium chloride solution discharged from the extracting agent liquid bath were approximately 60% and 130° C.

| | |
|---|---|
| Spent liquor | kg./hr.  1,270 |
| Air for effecting combustion | Nm.³/hr.  6,000 |
| Calcium chloride solution discharged from the extracting agent liquid bath | kg./hr.  5,660 |

(b) The structure and method of operation of the absorber were the same as in Example 1. The concentration and temperature of the hydrochloric acid solution obtained from the bottom were approximately 18% and 90° C. respectively.

| | Kg./hr. |
|---|---|
| Absorbing water | 8,300 |
| Circulating liquid in each part | 66,000 |
| Hydrochloric acid solution discharged from the bottom | 5,670 |

(c) The structure and method of operation of the scrubber were the same as in Example 1, except that a sodium hydroxide solution was used as a neutralizing agent; also, the effect produced was almost the same as produced in Example 1.

| | Kg./hr. |
|---|---|
| Circulating sodium hydroxide solution | 74,000 |

(d) The use of packed tower as an extractive distillation tower was the same as in Example 1. The concentration and temperature of the calcium chloride solution provided from the gas-liquid separator to the top were approximately 46.3% and 50° C. respectively. In addition, hydrochloric acid in the amount of approximately 18% was contained in said solution. Meanwhile, the concentration and temperature of the calcium chloride solution obtained from the bottom were approximately 32% and 130° C. respectively. In addition, approximately 2.7% hydrochloric acid was contained therein.

| | Kg./hr. |
|---|---|
| Steam required for reboiler | 1,780 |
| Calcium chloride solution provided from the gas-liquid separator to the top | 7,350 |
| Calcium chloride solution discharged from the bottom | 10,580 |

(e) The condenser 12 was water-cooled, while the partial condensers 24 and 27 were cooled by use of a refrigerator, resulting in obtaining anhydrous hydrogen chloride having water content of approximately 100 p.p.m.

| | |
|---|---|
| Gas temperature at the outlet of condenser  ° C. | 53 |
| Gas temperature at the outlet of partial condenser  ° C. | 0 |
| Anhydrous hydrogen chloride  kg./hr. | 700 |

I claim:
1. A process for recovering hydrogen chloride comprising the following sequential steps:
   (a) burning an organo-chlorine compound to obtain, a combustion gas containing hydrogen chloride;
   (b) directly injecting the combustion gas obtained in step (a) into an extraction agent solution containing sulfuric acid or calcium chloride stored in a tank to concentrate the extracting agent solution and simultaneously to cool the combustion gas;
   (c) contacting the combustion gas obtained in step (b) directly with water to form a dilute hydrochloric acid having a concentration below the azeotropic composition thereof; and
   (d) extractive distilling the dilute hydrochloric acid obtained in step (c) with the use of the concentrated extracting agent solution obtained in step (b) and obtaining, as a fraction, hydrogen chloride or hydrochloric acid having a concentration above the azeotropic composition thereof, and simultaneously recycling into step (b) a water-diluted extracting agent solution obtained as a distillation residue.

References Cited

UNITED STATES PATENTS

| | | | |
|---|---|---|---|
| 1,906,467 | 5/1933 | Heath | 23—154 |
| 2,220,570 | 11/1940 | Hurt | 23—154X |
| 2,357,095 | 8/1944 | Evans et al. | 23—154X |
| 2,436,432 | 2/1948 | Hunter | 23—154 |
| 2,730,194 | 1/1956 | Wohlers et al. | 23—154X |
| 2,950,180 | 8/1960 | Kunzer et al. | 23—154X |
| 2,950,953 | 8/1960 | Langlinais et al. | 23—154 |
| 3,079,231 | 2/1963 | Draper et al. | 23—154 |
| 3,146,061 | 8/1964 | Murib et al. | 23—154X |
| 3,268,296 | 8/1966 | Hall et al. | 23—154 |

FOREIGN PATENTS

| | | | |
|---|---|---|---|
| 669,671 | 4/1952 | Great Britain | 23—154 |

EDWARD STERN, Primary Examiner

U.S. Cl. X.R.

23—312